(12) United States Patent
Lennon et al.

(10) Patent No.: US 12,131,012 B2
(45) Date of Patent: Oct. 29, 2024

(54) USER INPUT MECHANISM FOR REORDERING GRAPHICAL ELEMENTS

(71) Applicant: MASTERCARD INTERNATIONAL INCORPORATED, Purchase, NY (US)

(72) Inventors: Stephen Lennon, Dublin (IE); Peter Groarke, Dublin (IE); Dawid Nowak, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 56 days.

(21) Appl. No.: 17/308,850

(22) Filed: May 5, 2021

(65) Prior Publication Data

US 2021/0349602 A1    Nov. 11, 2021

(30) Foreign Application Priority Data

May 6, 2020    (EP) .................................... 20173215

(51) Int. Cl.
*G06F 3/04842* (2022.01)
*G06F 3/0482* (2013.01)
*G06F 9/451* (2018.01)

(52) U.S. Cl.
CPC ........ *G06F 3/04842* (2013.01); *G06F 3/0482* (2013.01); *G06F 9/451* (2018.02)

(58) Field of Classification Search
CPC .. G06F 3/04842; G06F 3/0482; G06F 3/0483; G06F 3/0488–04883; G06F 9/451; G06F 2221/2133; G06F 21/36; G06F 16/22–2291; G06F 16/31–328; G06F 16/41; G06F 16/51; G06F 16/61; G06F 16/71; G06F 16/81; G06F 16/901–9027; G06F 16/951; G06F 7/08; G06F 7/24; (Continued)

(56) References Cited

U.S. PATENT DOCUMENTS 5,821,936 A * 10/1998 Shaffer ................. G06F 3/0482
715/810
6,392,662 B1 * 5/2002 Bou ....................... G06F 3/0481
715/790

(Continued)

FOREIGN PATENT DOCUMENTS

CN    115081755 A  *  9/2022

*Primary Examiner* — Benjamin Smith
(74) *Attorney, Agent, or Firm* — LOZA & LOZA, LLP

(57) ABSTRACT

The invention provides a user input mechanism for reordering of items displayed on a display in which the user is focused on item order, not item position as in the case of a drag and drop operation. The user selects one or more GUI elements displayed on a display of a data processing device in a desired order, where the time between each adjacent selected GUI element is less than a threshold time. Upon detection that no further selection has been made within the threshold time, the data processing device interprets the user as having completed their selection. At this point the selected one or more GUI elements are reordered based on the order that they were selected by the user, with any unselected GUI elements being placed before or after the reordered GUI elements as appropriate. The user is now free to make further selections if necessary.

20 Claims, 8 Drawing Sheets

(58) Field of Classification Search
CPC . G06F 7/26; G06F 7/22; H04L 9/3226–3228;
H04L 63/083–0846; Y10S 707/99937
See application file for complete search history.

(56) References Cited

U.S. PATENT DOCUMENTS

| | | | | |
|---|---|---|---|---|
| 7,036,088 B2* | 4/2006 | Tunney | ................ | G06F 3/0482 715/779 |
| 7,620,886 B1* | 11/2009 | Young | ................ | G06F 40/174 715/201 |
| 8,140,997 B2* | 3/2012 | Nemoto | ................ | G06F 3/048 715/802 |
| 8,347,234 B2* | 1/2013 | Akagi | ................ | H04N 1/00442 715/838 |
| 8,456,445 B2* | 6/2013 | De Mers | ............. | G06F 3/04886 345/174 |
| 8,799,775 B2* | 8/2014 | Weeldreyer | ........... | G06F 40/109 715/255 |
| 8,984,441 B2* | 3/2015 | Eyer | ................ | G06F 3/04842 715/811 |
| 9,046,989 B2* | 6/2015 | Kim | ................ | G06F 3/0488 |
| 10,503,364 B2* | 12/2019 | Sasaki | ................ | G06F 3/0482 |
| 10,970,379 B2* | 4/2021 | Cortez | ................ | G06F 3/04817 |
| 11,093,129 B2* | 8/2021 | Ananthapur Bache | ...................... | G06F 3/04883 |
| 11,113,173 B2* | 9/2021 | Hoffman | ................ | G06F 3/0482 |
| 11,194,447 B2* | 12/2021 | Delanghe | ................ | H04L 67/1044 |
| 11,853,530 B2* | 12/2023 | Delanghe | ................ | G06F 3/04847 |
| 2002/0178191 A1* | 11/2002 | Sielken | ................ | G06F 3/0482 715/244 |
| 2005/0004917 A1* | 1/2005 | Ueda | ................ | G06T 11/60 |
| 2005/0022138 A1* | 1/2005 | Tunney | ................ | G06F 3/0482 715/837 |
| 2005/0144484 A1* | 6/2005 | Wakayama | ............. | G06F 21/36 726/19 |
| 2005/0251751 A1* | 11/2005 | Feiler | ................ | G06F 3/0482 725/39 |
| 2008/0189649 A1* | 8/2008 | Kikuchi | ................ | G11B 27/105 707/E17.031 |
| 2008/0214298 A1 | 9/2008 | Byng | | |
| 2008/0301583 A1* | 12/2008 | Akagi | ................ | H04N 1/00458 715/838 |
| 2009/0138818 A1* | 5/2009 | Nemoto | ................ | G06F 3/048 715/790 |
| 2009/0150814 A1* | 6/2009 | Eyer | ................ | G06F 3/04842 715/765 |
| 2009/0199134 A1* | 8/2009 | Murayama | ........... | G06F 3/0482 715/835 |
| 2010/0180336 A1 | 7/2010 | Jones et al. | | |
| 2011/0078560 A1* | 3/2011 | Weeldreyer | ........... | G06F 3/0488 715/255 |
| 2011/0239145 A1* | 9/2011 | Kim | ................ | G06F 3/04842 715/765 |
| 2012/0179994 A1* | 7/2012 | Knowlton | ............. | G06F 3/0488 715/779 |
| 2012/0216150 A1* | 8/2012 | Wernecke | ........... | G06F 3/04886 715/850 |
| 2013/0055164 A1* | 2/2013 | Bergsbjork | ........... | G06F 3/0482 715/845 |
| 2013/0063484 A1* | 3/2013 | Gehani | ................ | G06F 8/38 345/629 |
| 2013/0104227 A1* | 4/2013 | Dow | ................ | G06F 21/316 726/19 |
| 2013/0139226 A1* | 5/2013 | Welsch | ................ | G06F 21/30 726/4 |
| 2014/0331187 A1* | 11/2014 | Hicks | ................ | G06F 3/04842 715/845 |
| 2015/0199073 A1 | 7/2015 | Kukulski et al. | | |
| 2017/0046019 A1* | 2/2017 | Hasegawa | ........... | G06F 3/04817 |
| 2017/0208073 A1 | 7/2017 | Eleish | | |
| 2018/0210640 A1* | 7/2018 | Vijay Kumar | ...... | G06F 3/04883 |
| 2018/0348968 A1* | 12/2018 | Sasaki | ................ | G06F 3/04845 |
| 2020/0089592 A1* | 3/2020 | Hoffman | ................ | G06F 3/0482 |
| 2021/0049256 A1* | 2/2021 | Cortez | ................ | G06F 21/604 |
| 2021/0132749 A1* | 5/2021 | Delanghe | ................ | G06F 16/953 |
| 2022/0164073 A1* | 5/2022 | Delanghe | ................ | H04L 67/306 |

* cited by examiner

USER INPUT MECHANISM FOR REORDERING GRAPHICAL ELEMENTS

CLAIM OF FOREIGN PRIORITY

The present application for patents claims priority to European Patent Application number 20173215.3, filed May 6, 2020, and which is incorporated by reference hereto, and which also assigned to assignee hereof.

BACKGROUND

Many user interfaces make use of graphical elements that a user interacts with in order to control an electronic device. Examples include icons, scroll bars, buttons, text fields, and others.

A class of operation that is often performed by a user is a reordering operation, e.g. to specify an order of preference or an order of execution. For example, a digital wallet application may store a number of payment credentials and provide a graphical representation of each credential in the form of a graphical element having the appearance of a physical payment card. The order of the graphical representations may correspond to an order of usage preference; e.g. a payment credential corresponding to a topmost graphical representation may be most preferred for use in an electronic payment. The user interface of the digital wallet application may enable the user to reorder the graphical representations so as to edit the order of credential usage preference.

Another example where a reordering operation may be necessary is in the case of verification that a user is a human rather than an automated bot. It is a known technique in such verification scenarios to present a task for completion, where the task is readily completed by a human but difficult or impossible for a bot to complete. Successful completion of the task is thus indicative that the user is a human rather than a bot.

One such verification task is a word reordering task, where the user is presented with a word in scrambled form and is required to place the letters of the word in the correct order. This task may alternatively involve reordering scrambled segments of an image to form the correct image.

A known way of reordering graphical elements is referred to as a 'drag and drop' operation. This involves the user selecting a particular graphical element using a pointing device, holding the selection with the pointing device whilst moving ('dragging') the pointing device to the desired location of the selected graphical element, and releasing the selection with the pointing device once the graphical element is at the desired location.

A problem with the drag and drop operation is that it was designed for use with a mouse and in connection with a desktop computer. The drag and drop operation may work reasonably well in this scenario, but it may not be particularly easy to perform precisely on a touchscreen, particularly a smaller touchscreen such as often found on a tablet computer or mobile phone, or using a trackpad, touchpad or pointing stick of the type that can be found e.g. on a laptop computer. Additionally, in the case of a touchscreen the user may need to contact a reasonable proportion of the screen with their finger in order to perform the drag and drop operation, potentially leaving undesirable marks over this area of the screen. There is therefore a need for an alternative user input mechanism for reordering graphical elements, which mechanism would ideally be particularly suited for use with touchscreens and other non-mouse based human interface devices such that user experience is improved.

Additionally, in order to enable the user to properly control the drag and drop operation it is necessary to provide some form of feedback as the operation progresses. This feedback is typically provided graphically, e.g. a translucent form of the graphical element that the user has selected may be rendered on a display and moved in conjunction with the pointing device to enable the user to accurately perform the drag and drop operation. Unselected graphical elements may be reordered whilst the drag and drop operation is taking place to allow the user to preview the new order of the graphical elements should they choose to end the drag and drop operation with the pointing device in its current location. Non-visual feedback, e.g. haptic feedback, may also be provided. For this feedback to be useful, it must be provided in real time. Provision of this feedback generates additional computational load which it may be desirable to avoid, particularly in lower resource electronic devices such as mobile phones. This is true even in the case where a known technique of only redrawing screen regions that change from one screen refresh event to the next is used. This technique does not reduce the processing burden because the visual feedback provided for the drag and drop operation necessitates frequent redrawing. There is therefore a need for an alternative user input mechanism for reordering graphical elements, which mechanism would ideally create little additional computational load for a processor of an electronic device.

Furthermore, the drag and drop operation may be time consuming and non-intuitive. Consider the task of reordering scrambled letters of a word or segments of an image. The user has to drag and drop each letter or image segment one by one into the place they wish it to be located, with the user's focus being split between the current location of the letter or image segment and the desired location of the letter or image segment. This is a relatively slow process and the user may find it difficult to retain focus on the overall word or image due to being forced to consider the position of the letter or image segment and its intended destination in isolation of the overall word or image. The user may therefore be prone to making mistakes in the reordering process, leading to further time being taken to rectify these mistakes, with the overall process being counter-intuitive. There is therefore a need for an alternative user input mechanism for reordering graphical elements, which mechanism would ideally be more intuitive for a user such that user experience is improved.

SUMMARY OF THE INVENTION

Broadly speaking the invention provides a user input mechanism for reordering of items displayed on a display in which the user is focused on item order, not item position as in the case of a drag and drop operation. The user selects one or more GUI elements displayed on a display of a data processing device in a desired order, where the time between each adjacent selected GUI element is less than a threshold time. Upon detection that no further selection has been made within the threshold time, the data processing device interprets the user as having completed their selection. At this point the selected one or more GUI elements are reordered based on the order that they were selected by the user, with any unselected GUI elements being placed before or after the reordered GUI elements as appropriate. The user is now free to make further selections if necessary.

In a first aspect the invention provides a computer-implemented method for receiving user input to a data processing device having a user input component, a memory and a display, the user input component for enabling a user to provide input to the data processing device, the method comprising, by the data processing device: i) displaying a plurality of graphical user interface, GUI, elements on the display in an ordered arrangement, each of the plurality of GUI elements having an associated unique index corresponding to a position of the respective GUI element within the ordered arrangement; ii) receiving, via the user input component, one or more selection events in a selection order, each of the one or more selection events corresponding to one of the plurality of GUI elements, wherein a time between adjacent selection events of the one or more selection events is less than a threshold time; and iii) reordering the plurality of GUI elements on the display based on the selection order.

In a second aspect the invention provides a data processing device comprising a user input component, a memory and a display, the data processing device configured to carry out the method of the first aspect.

In a third aspect the invention provides a non-transitory computer-readable storage medium storing computer-readable instructions which, when executed by a data processing device comprising a user input component, a memory and a display, cause the data processing device to carry out the method of the first aspect.

BRIEF DESCRIPTION OF THE DRAWINGS

Embodiments of the present invention are described below, by way of example only, with reference to the accompanying drawings, in which.

DETAILED DESCRIPTION

Figure 1:
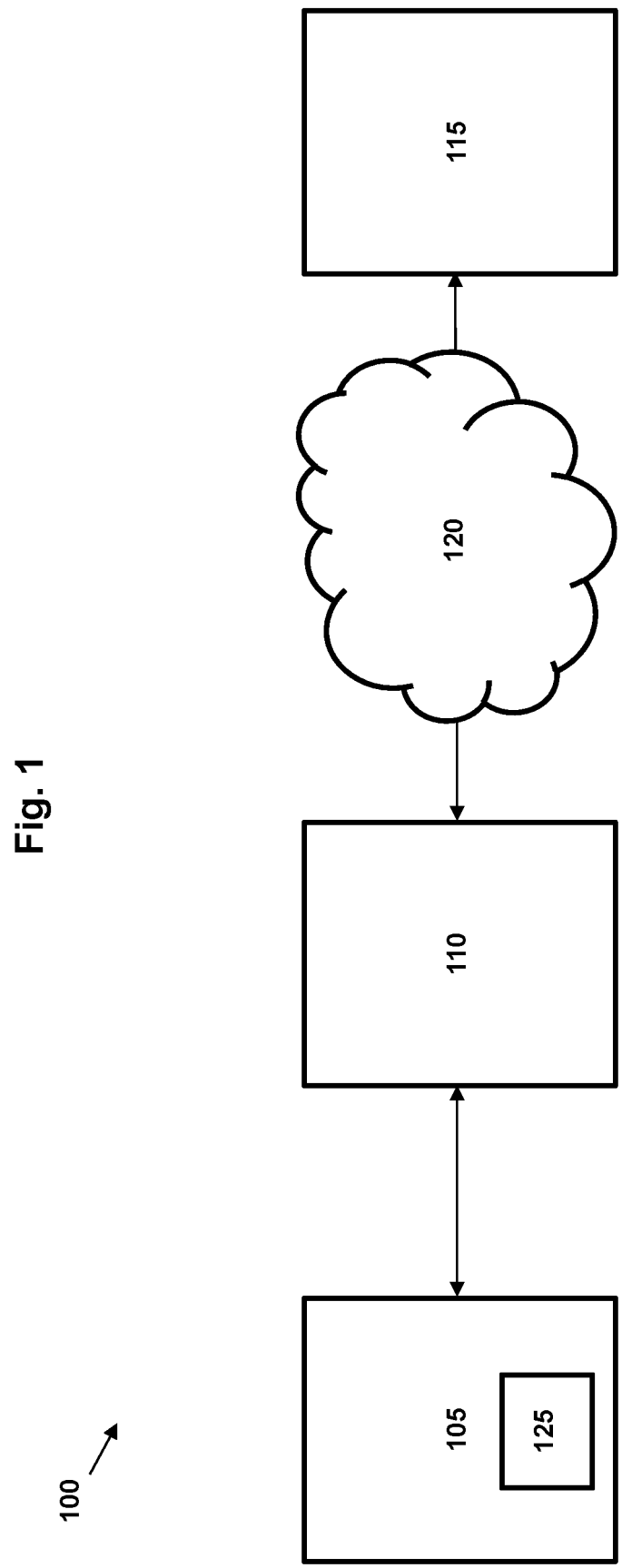
FIG. 1 illustrates a system in which the invention may operate, according to an embodiment.

FIG. 1 illustrates an exemplary system 100 in which the invention may operate. System 100 includes a data processing device 105 and a point of sale (POS) terminal 110. POS terminal 110 is communicatively coupled to a payment processing network server 115 via a network 120. Network 120 could be, for example, the internet, a wide area network, etc. Data processing device 105 may be, for example, a mobile phone or other such portable data processing device that is enabled to make electronic payments.

Data processing device 105 includes a user input component that enables a user to provide input to data processing device 105. User input component can take the form of a touchscreen, a touchpad, a trackpad, a mouse or a pointing stick. While the invention offers particular benefits in terms of improvement in user experience in the case of types of user input component other than a mouse, benefits of the invention relating to computational load are realised irrespective of the type of user input component. Thus, the invention still offers benefits when the user input component is a mouse.

System 100 is configured to take electronic payments using a payment credential provisioned onto data processing device 105, as is known in the art per se. Data processing device 105 includes a software application 125 that assists with the payment process. Application 125 may be known as a 'digital wallet' or simply a 'wallet' application. Application 125 stores, or otherwise has access to, one or more payment credentials for use in effecting an electronic payment. Data processing device 105 can participate in a transaction by communicating with POS terminal 110 via a short-range wireless channel, e.g. a NFC or Bluetooth channel. POS terminal 110 receives via the short-range wireless channel a payment credential from data processing device 105 and passes this payment credential on to payment processing network server 115 for processing of the transaction. This process may be coordinated by application 125. The process by which such a system takes electronic payments is not described in detail here as it is known in the art per se.

Application 125 includes a user interface that is displayed on a display of data processing device 105. The user interface enables the user to select a particular payment credential for use in a transaction.

Figure 2:
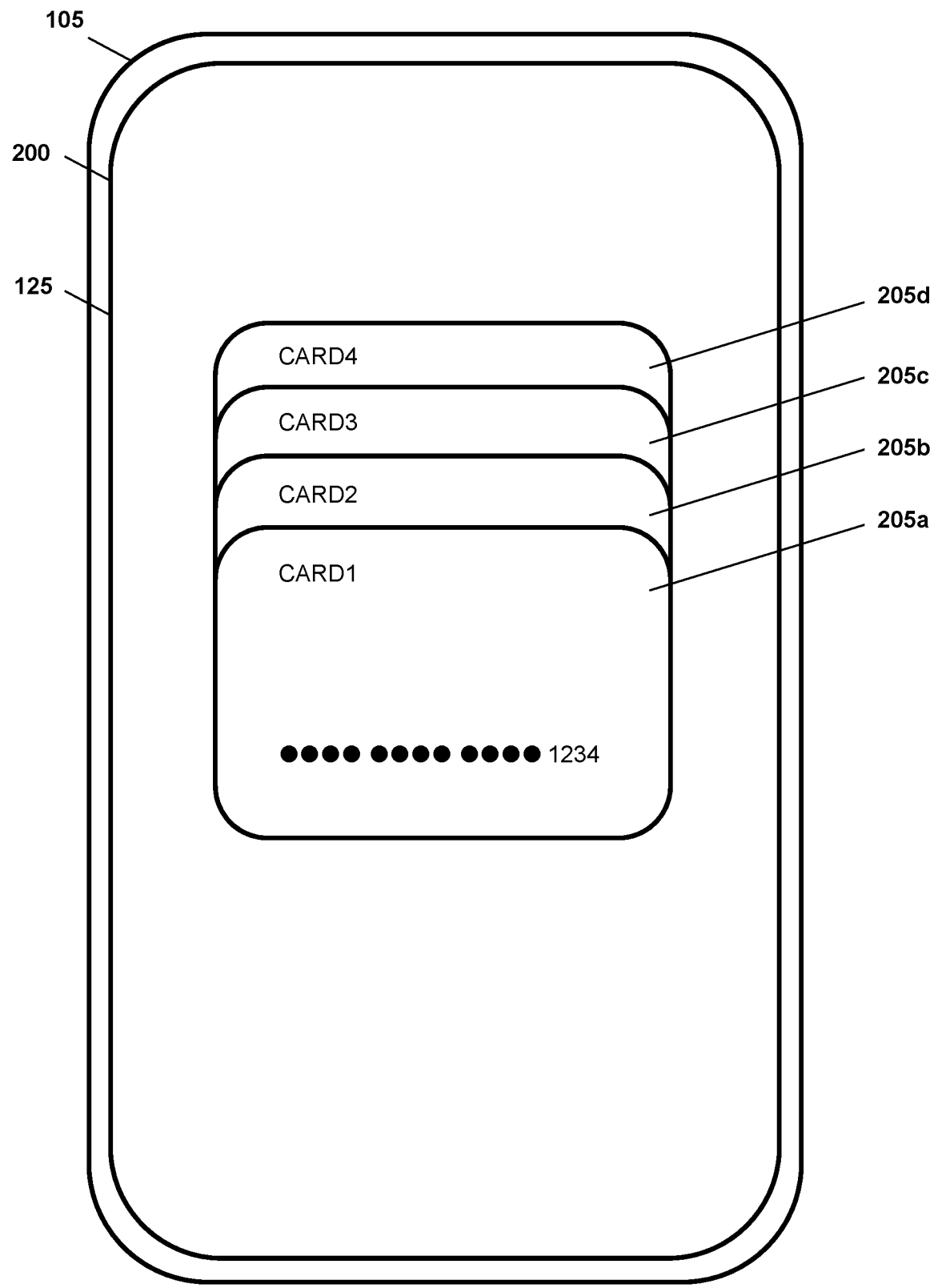
FIG. 2 illustrates a data processing device displaying an exemplary user interface that is suitable for implementing the invention, according to an embodiment.

One such exemplary user interface 200 is shown in FIG. 2. In this particular exemplary embodiment, graphical user interface (GUI) elements 205a, 205b, 205c, 205d are provided, with each GUI element being a representation of a payment credential that has been provisioned on data processing device 105. The user is able to use GUI elements 205a-205d to indicate to application 125 which payment credential should be used in a transaction. The user is able to order and reorder GUI elements 205a-205d, with the order corresponding to an order of preference in which the corresponding payment credentials are to be used. In the illustrated example, GUI element 205a is the topmost element of the 'stack', meaning that the payment credential associated with GUI element 205a ranked as most preferred. The least preferred payment credential is currently associated with GUI element 205d, with the remaining payment credentials being intermediate in the order shown.

Figure 3:
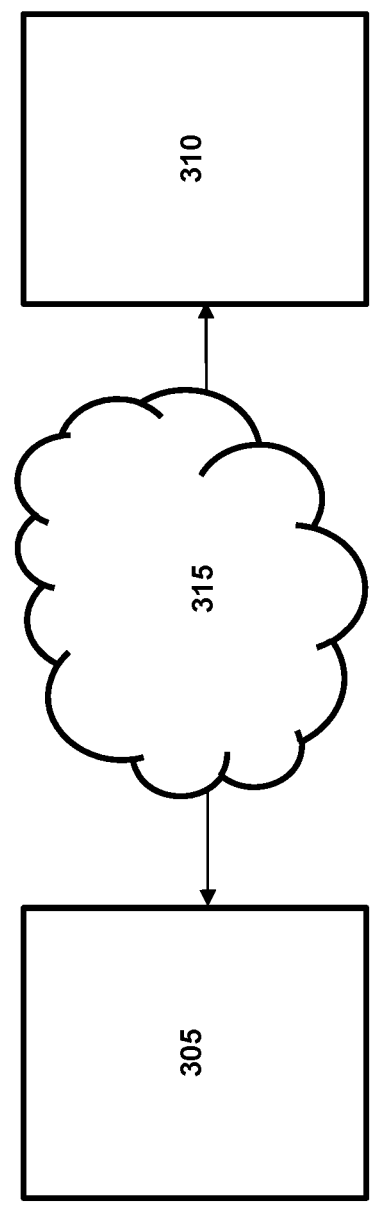
FIG. 3 illustrates another system in which the invention may operate, according to an embodiment.

FIG. 3 illustrates another exemplary system 300 in which the invention may operate. System 300 includes a data processing device 305 that is communicatively coupled to a web server 310 via network 315. Network 315 could be, for example, the internet, a wide area network, etc. Data processing device 305 could be a desktop computer or a portable data processing device such as a mobile phone, laptop computer, tablet computer, and the like.

Figure 4:
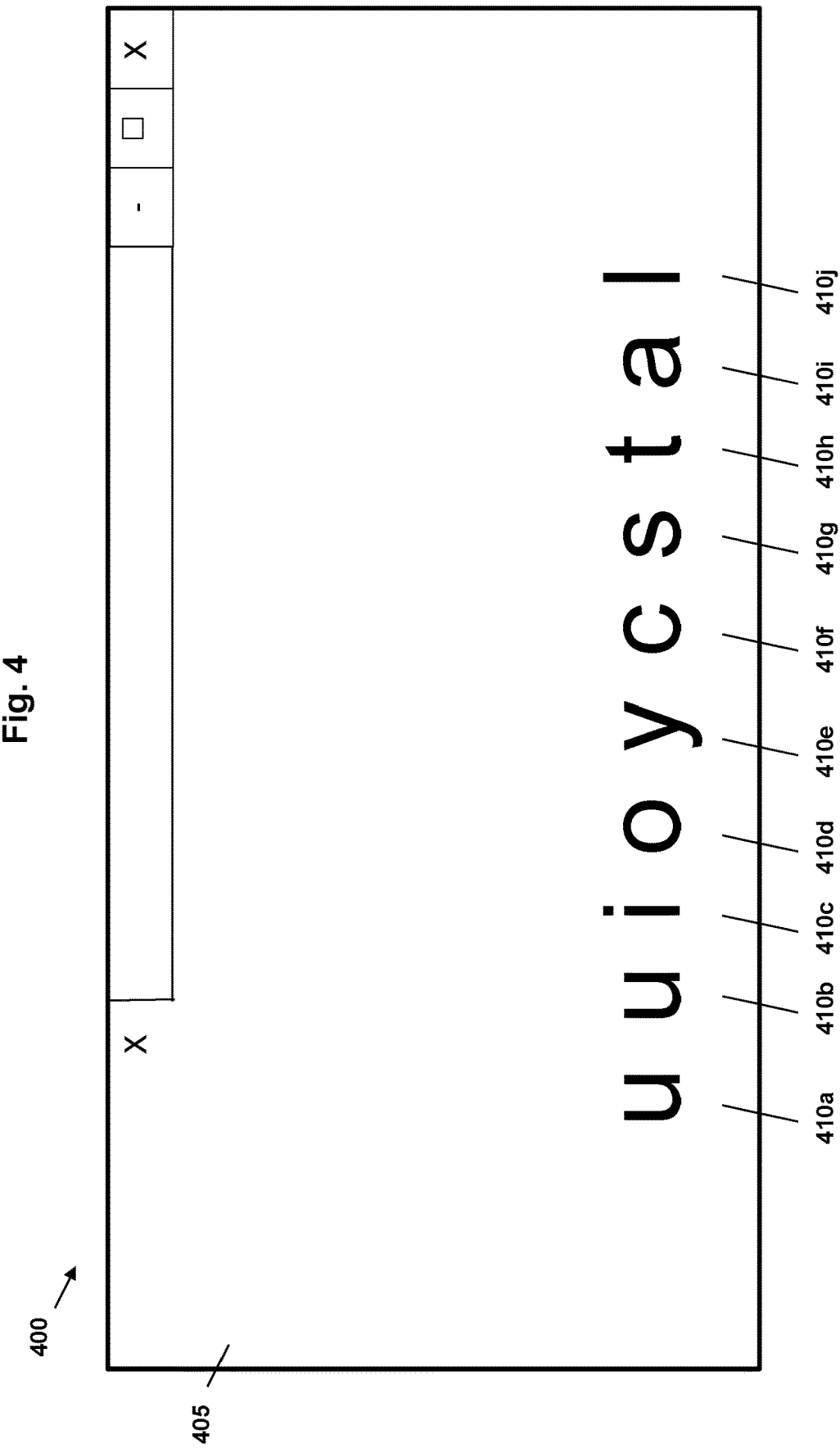
FIG. 4 illustrates a data processing device displaying another exemplary user interface that is suitable for implementing the invention, according to an embodiment.

Web server 310 provides a service that a user of data processing device 305 wishes to access. The service is protected by a security challenge that includes a task that the user is required to successfully perform in order to prove that they are a human user rather than a script or bot. FIG. 4 shows an exemplary user interface 400 provided within a browser tab 405 of a web browser application installed on data processing device 305. User interface 400 includes a set of GUI elements 410a-410j that in this illustration take the form of letters. GUI elements 410a-410j are initially presented to the user in scrambled form, i.e. in a form that is immediately apparent to a human as 'incorrect'. In this case, the letters are scrambled such that they do not correctly spell any word in the English language. The user is required to unscramble the GUI elements 410a-410j by reordering them appropriately—in this example, reordering the letters to spell the word 'cautiously'. Successfully reordering the letters enables the web server 310 to verify that the user is a human rather than a bot and grant the user access to the service provided by web server 310.

It will be appreciated that the user interfaces shown in FIGS. 2 and 4 are purely exemplary and that many variations in such user interfaces are possible. The invention is also not limited by such as it is capable of operating in any scenario in which it is desirable for a user to be able to reorder a set of GUI elements. Specifically, the invention is operable in either of the scenarios discussed above, and in any other scenario in which a user seeks to reorder a set of GUI elements.

Figure 5:
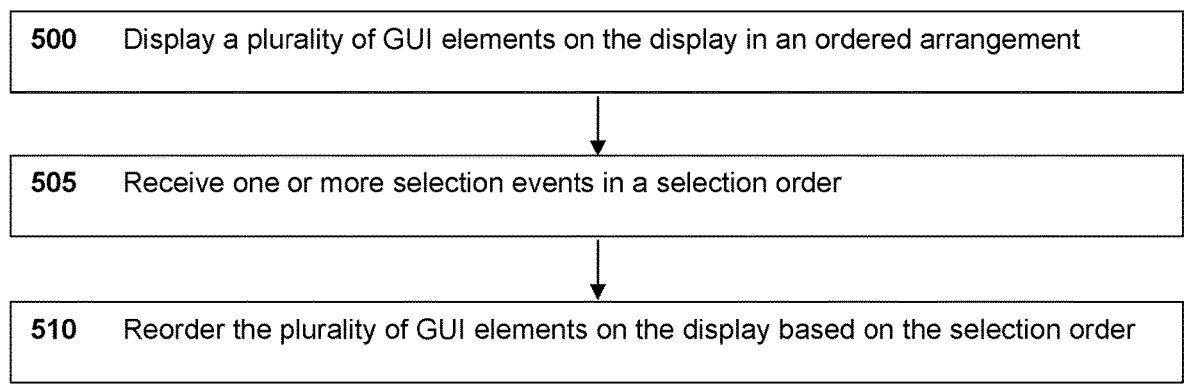
FIG. 5 sets out a process by which the data processing device can perform a reordering operation based on user input, according to an embodiment.
Figure 6:
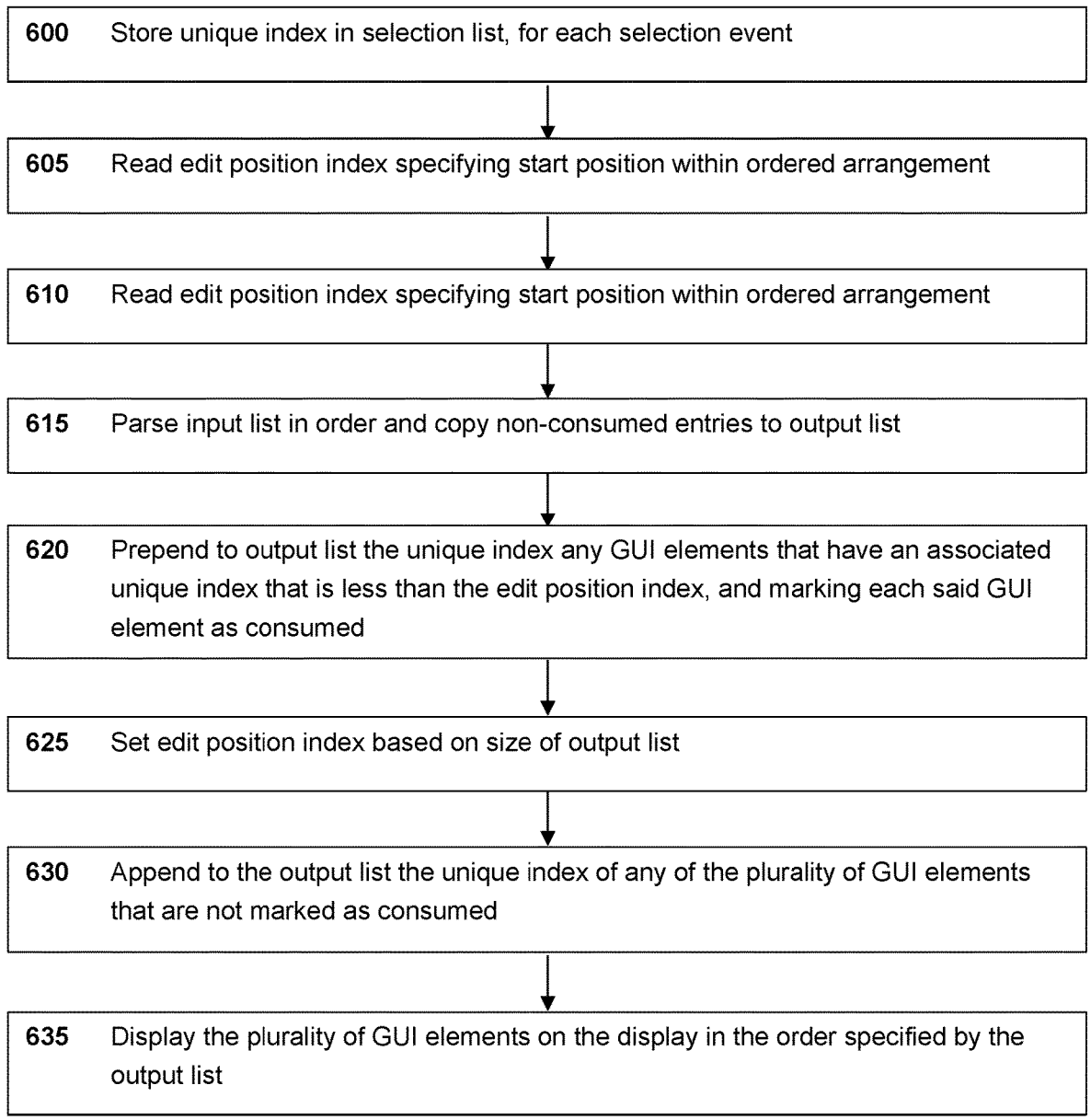
FIG. 6 sets further details of the process of FIG. 5, according to an embodiment.
Figure 7:
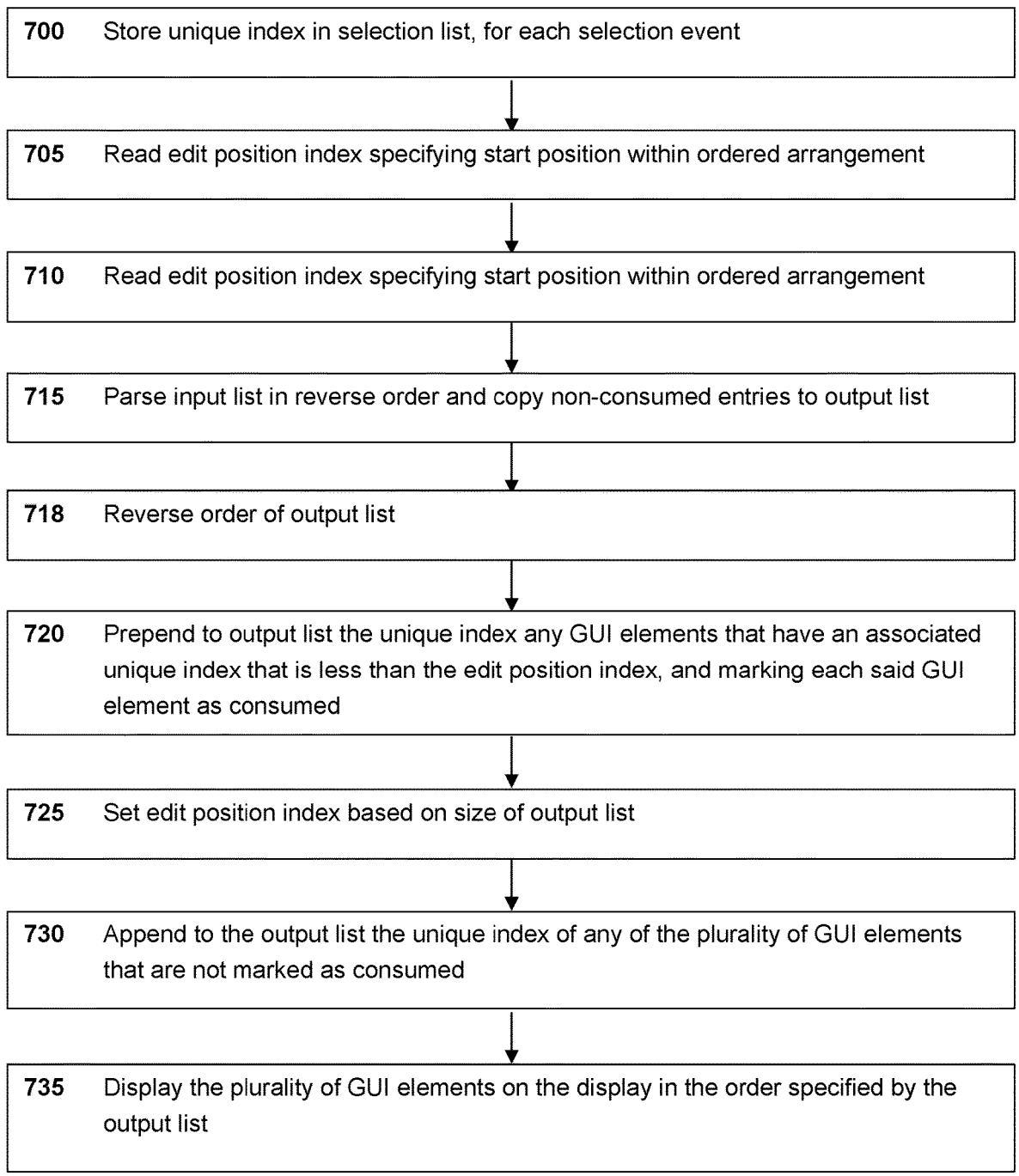
FIG. 7 sets further details of the process of FIG. 5, according to an embodiment.

The invention performs a reordering operation described below and as shown in FIG. 5. FIGS. 6 and 7 set out preferred steps of the reordering operation.

In step 500, data processing device 105, 305 displays a plurality of GUI elements on its display in an ordered arrangement. Each GUI element has an associated unique index corresponding to the position of the respective GUI element within the ordered arrangement.

Applying this to the arrangement shown in FIG. 2, the ordered arrangement can be expressed as shown below in Table 1:

TABLE 1

| Unique index | GUI Element |
| --- | --- |
| 1 | 205a ('CARD1') |
| 2 | 205b ('CARD2') |
| 3 | 205c ('CARD3') |
| 4 | 205d ('CARD4') |

In this instance the unique index is one-based. GUI element 205a is at the 'front' of the 'stack' of GUI elements and is therefore assigned the lowest unique index (in this case '1'), indicating that element 205a is currently the first or highest priority in the ordered arrangement. The other GUI elements are assigned unique indexes based on their position in the stack.

Applying this to the arrangement shown in FIG. 4, the ordered arrangement can be expressed as shown below in Table 2:

TABLE 2

| Unique index | GUI Element |
| --- | --- |
| 0 | 410a ('u') |
| 1 | 410b ('u') |
| 2 | 410c ('i') |
| 3 | 410d ('o') |
| 4 | 410e ('y') |
| 5 | 410f ('c') |
| 6 | 410g ('s') |
| 7 | 410h ('t') |
| 8 | 410i ('a') |
| 9 | 410j ('l') |

In this instance the unique index is zero-based. GUI element 410a is at the leftmost position of the 'word' and is therefore assigned the lowest unique index (in this case '0'), indicating that element 410a is currently the first or highest priority in the ordered arrangement. Similarly, the other GUI elements 410b-410j are assigned a unique index based on their position within the 'word'.

While numerical indices based on the decimal system have been shown, the invention is not limited in this respect and equivalent indices in other forms can alternatively be used. For example, a binary-based or hexadecimal-based indexing system can be used instead.

Data processing device 105, 305 may provide a mechanism for enabling the user to reset the ordering of the plurality of GUI elements to a default or original ordering. In this case, step 500 may include storing an initial order of the plurality of GUI elements, i.e. the order of the plurality of GUI elements before any user input relating to reordering has been received by data processing device 105, 305. In response to receiving a reset command, data processing device 105, 305 may display the plurality of GUI elements in the initial order. The reset command may be provided to data processing device 105, 305 via a specifically configured user interface element, e.g. a reset button. Alternatively the reset command may be a particular form of user input received via the user input component of data processing device 105, 305; e.g. a particular gesture, sequence of taps, clicks, a 'shake' operation, and/or keystrokes. More than one reset mechanism may be available simultaneously to allow the user to choose whichever mechanism is most convenient at the time.

The reset command may alternatively revert the plurality of GUI elements to the order as was present before the most recent reordering operation was performed. In this case the reset command may be thought of as an undo command, which reverses the most recent reordering operation but does not revert the GUI elements to their original order.

In step 505, data processing device 105, 305 receives, via the user input component, one or more selection events in a selection order. Each of the one or more selection events corresponding to one of the plurality of GUI elements. The nature of the selection event will depend on the specifics of the user input component. For example, in the case where the user input component is a touchscreen, each selection event can take the form of a touch event occurring within the bounds of a particular GUI element. Equivalent events for other user input components will be apparent to the skilled person having the benefit of the present disclosure.

The time between adjacent selection events is less than a threshold time. The threshold time may be, for example, in the range of one second to five seconds, more preferably in the range of one second to three seconds. That is, data processing device 105, 305 interprets user input component events as a consecutive series of selection events provided that the time between adjacent user interface component events is less than the predetermined time. This provides an intuitive user experience in which the user selects a set of GUI elements in relatively rapid succession and then pauses for a time longer than the threshold time to signal to data processing device 105, 305 that the user has completed all of the selections that they wish to make for the time being. The reordering operation is then performed and the display updated to show the reordered GUI elements.

It is possible for a single GUI element to be selected multiple times. In this case, the later selection may be ignored such that the position of the GUI element within the selection order remains based on the earliest selection received for that GUI element (see FIG. 6). Alternatively, the position of the GUI element within the selection order can be based on the latest selection received for that GUI element (see FIG. 7).

Optionally, feedback can be provided to the user to assist with making selections. If provided, such feedback preferably involves adjusting an aspect of a selected GUI element to indicate that it has been selected. The adjusted aspect can include any one or more of the following: a frame of the GUI element; a border of the GUI element; a size of the GUI element; a colour of the GUI element; a shape of the GUI element; an opacity of the GUI element; a location of the GUI element on the display. The GUI element itself may be altered, e.g. by including a superscript number within the GUI element to indicate the order of selection. Other suitable aspects for adjustment will be readily apparent to a skilled person having the benefit of the present disclosure. This may assist the user in easily identifying those GUI elements that they have already selected, to avoid repeat selection. In a preferred implementation, selected GUI elements are highlighted.

It is preferred if such feedback is provided that it is removed once the reordering operation is complete so that the user does not confuse selections made in a previous reordering operation with selections made in a current reordering operation. Reordered GUI elements may be altered to indicate that they have been the subject of at least one reordering operation, and this is described in more detail later in this specification.

Optionally, a GUI element may be made unselectable following a selection of that GUI element. This may involve setting a property associated with the GUI element that determines whether it is selectable to 'FALSE' or some other value indicating that the GUI element is non-selectable.

In step 510, data processing device 105, 305 reorders the plurality of GUI elements based on the selection order. Two specific ways for performing this re-ordering are discussed below in connection with the embodiments of FIGS. 6 and 7.

Optionally, functionality may be provided to enable the user to instruct data processing device 105, 305 to enter and exit a reordering mode. In the reordering mode, selections of GUI elements may be interpreted by data processing device 105, 305 as a selection relating to a reordering operation, and processed according to the method of FIG. 5. Outside of the reordering mode, selections of GUI elements may be interpreted by data processing device 105, 305 according to the default action associated with such a selection, i.e. in some manner other than a reordering operation. This action may be defined, for example, by an operating system or software application executing on data processing device 105, 305. The possible actions include taking no action, i.e. ignoring the selection of a GUI element unless data processing device 105, 305 is currently in reordering mode.

The functionality may take the form of one or more buttons, e.g. a button labelled 'start' and a button labelled 'finish' to enable the user to instruct the data processing device 105, 305 to enter and exit reordering mode, respectively. This functionality may take other forms, e.g. a certain gesture, keystroke or keystroke combination may cause data processing device 105, 305 to enter and exit reordering mode. The ability to toggle between reordering and 'normal' mode may further improve user experience.

The invention is distinct from existing reordering mechanisms in a number of ways. Firstly, as the re-ordering is based on selection order, user experience is improved. This is because selecting a set of GUI elements in the order in which the user wishes them to be displayed is an intuitive operation. This is in contrast with drag and drop type reordering operations where the user must focus on the particular element they wish to move whilst also focusing on the overall arrangement to move the element into the desired location. In this case, reordering is based on the on-screen location of the GUI element as specified by the user at the end of the drag and drop operation, not the order in which GUI elements were selected by the user.

Reordering by selection order according to the invention is also quicker, as the user need only provide one brief input such as a click or tap per GUI element to be reordered. In contrast, a drag and drop operation involves a longer form of user input, e.g. a click and hold operation or a touch and drag operation.

Secondly, the invention does not require any feedback to be provided to the user whilst the reordering takes place. This is in contrast to a drag and drop operation where some form of indication, e.g. a translucent replica of the currently selected GUI element, or haptic feedback, is provided in order to enable the user to monitor and control the drag and drop operation correctly. This feedback is continuous in the sense that it is provided throughout the entire drag and drop operation. It is also provided for each drag and drop operation in the reordering process. The invention can reduce the processing load on data processing device 105, 305 as it does not need to provide continuous feedback of this type. This holds even in the optional case discussed above where an aspect of a selected GUI element is adjusted to indicate that a selection has been performed, as this adjustment necessitates a relatively computationally inexpensive single redraw operation. Drawing a representation of the GUI element during the dragging part of the drag and drop operation, on the other hand, requires many redrawing operations that must be performed in real-time.

Thirdly, it is easier to accurately perform a single selection of a GUI element per the invention rather than guide the dragging part of the drag and drop operation correctly. Users are more prone to making errors with a drag movement than a click or tap movement, particularly in the case where data processing device 105, 305, has a relatively small display, e.g. where data processing device 105, 305 is a portable data processing device such as a mobile phone, tablet or laptop, and/or where the user input component is relatively imprecise such as a trackball, trackpad or pointing stick. The invention thus provides an improved mechanism for enabling user input when reordering a set of GUI elements.

Fourthly, in the case where the user input component is a touchscreen, the user need only touch the touchscreen at single discrete points in order to effect the reordering according to the invention. In contrast, the user needs to continuously move their finger over a reasonable proportion of the touchscreen when performing a drag and drop operation, potentially leaving undesirable marks along the path taken by the user's finger to perform the drag part of the operation. The invention therefore minimises undesirable marks on the touchscreen attributable to a reordering operation. Additionally, the user's finger does not obscure the area where the GUI element is to be dropped as can be the case in a drag and drop operation.

The reordering performed in step 510 of FIG. 5 can be carried out in at least two distinct ways, each of which is an embodiment of the invention. These two embodiments are described below with reference to FIGS. 6 and 7.

Referring first to FIG. 6, in step 600 data processing device 105, 305 stores, in an input list, for each of the one or more selection events (step 505), the unique index associated with the one of the plurality of GUI elements selected in the respective selection event. An exemplary input list is as follows.

Referring here to FIG. 4, assume the user inputs the following series of selections, with the time between adjacent selections being less than the threshold time: {1, y}. The user then provides no further input within the threshold time. Referring also to Table 2 above, the input list generated by data processing device 105, 305 has the form: {9, 4}. It will be appreciated that this input list is purely exemplary and that the invention is not limited to generating an input list of this form. Rather, the invention encompasses any form of input list that captures the order of selection of GUI elements by the user.

The input list is populated in chronological order, i.e. the earliest selection made by the user will be the first entry in the input list and the latest selection made by the user will be the last entry in the input list.

In step 605, data processing device 105, 305 reads an edit position index stored in its memory, the edit position index specifying a start position within the ordered arrangement. The edit position index has the function of indicating the position of the last GUI element that has been reordered by the user within the ordered arrangement. This enables data processing device 105, 305 to accept multiple rounds of selection from the user, as the edit position index can be used by data processing device 105, 305 to locate second and subsequent selections within the ordered arrangement relative to GUI elements that have already been reordered by the user. The edit position index may be represented to the user in some manner such as a modification to GUI elements that have already been reordered as discussed below, and/or by drawing an edit position index GUI element on the display. The edit position index GUI element may be, for example, an arrow, a dot, a line, etc.; essentially any GUI element that is capable of unambiguously indicating the current value of the edit position index to the user.

Referring again to FIG. 4 and Table 2, in the case where the selection of the letters l and y is the first selection made by the user, the edit position index is set to 0, i.e. the beginning of the ordered arrangement.

In step 610, data processing device 105, 305 generates an empty output list. This output list will be populated as described below to determine the order in which the plurality of GUI elements are to be displayed, based on the selections made by the user.

In step 615, data processing device 105, 305 parses the input list in order and, for each entry in the input list, if the entry is not marked as consumed, copies the corresponding unique index to the output list, and marks the copied entry as consumed in the input list.

A consumed entry in the input list is an entry that has already been copied to the output list. Consumed thus indicates that this unique index has already been processed and does not need to be processed again. This ensures that the output list includes only one instance of each unique index. In the case where the user selects a particular GUI element more than once, in the embodiment of FIG. 6 the earliest selection of the GUI element will dictate the position of that GUI element within the reordered arrangement. Effectively, second and subsequent selections of the same GUI element are ignored in the embodiment of FIG. 6 for the purposes of reordering because at the time of considering the second and subsequent selections the unique index for the relevant GUI element is already marked as consumed. An entry in the input list can be marked as consumed in any manner known to the skilled person, e.g. setting a value of a flag associated with the entry to indicate that the entry is consumed.

At the end of the operation of step 615 the output list thus contains one instance of each unique index corresponding to the selected GUI elements, where the order of the unique indexes in the output list reflects the first selection of each of the selected GUI elements. Continuing with the example above, the output list takes the form {9, 4} at the end of the operation of step 615.

In the case where the user performs the selection {l, y, l}, the input list has the form {9, 4, 9} and the output list has the form {9, 4}. The second selection of the GUI element 410*j* is ignored in this embodiment, as it has been marked as consumed by the time data processing device 105, 305 considers it for the second time.

Once the entire input list has been parsed, in step 620 data processing device 105, 305 prepends to the output list the unique index of any of the plurality of GUI elements that have an associated unique index that is less than the edit position index, and marks each said GUI element as consumed. In the case as in the example above where the edit position index is zero, step 620 does not prepend anything to the output list. In this particular example the output list would therefore remain as {9, 4} following step 620. However, if the edit position index were set as 1, for example, the output list following step 620 would have the form {0, 9, 4} and unique index 0 would be marked as consumed.

In step 625 data processing device 105, 305 sets the edit position index based on a size of the output list. Step 625 is performed after step 620 and before step 630 to ensure that the edit position index accurately captures both a) GUI elements that have been reordered in a previous operation (those prepended in step 620) and b) GUI elements that are being reordered as part of the ongoing reordering operation. The size of the output list refers to the number of elements contained within the output list—in the examples provided in the immediately preceding paragraph, the size of output list {9, 4} is 2 and the size of output list {0, 9, 4} is 3.

The objective of step 625 is to set the edit position such that, in the next iteration of the method of FIG. 6, all previously reordered GUI elements are prepended in step 620. The edit position index may be set equal to the size of the output list in the case of a one-based indexing system, or the edit position index may be set equal to the size of the output list minus one in a zero-based indexing system. A skilled person given the benefit of the present disclosure will be able to determine the appropriate value to set the edit position index in step 625 for other indexing schemas.

In step 630, data processing device 105, 305 appends to the output list the unique index of any of the plurality of GUI elements that are not marked as consumed. This has the effect of appending the unique indexes of any GUI elements that have not been selected in the current iteration of the method of FIG. 6 and which are located after the edit position index to the output list. Continuing with the example output list {9, 4} discussed above, following step 630 this output list has the form {9, 4, 0, 1, 2, 3, 5, 6, 7, 8}. At this point the output list contains one instance of a unique index for each GUI element; i.e. the final order of all of the GUI elements following this iteration of the method of FIG. 6 is now known.

In step 635, data processing device 105, 305 displays the plurality of GUI elements on the display in the order specified by the output list. In the case of the example output list {9, 4, 0, 1, 2, 3, 5, 6, 7, 8}, upon completion of step 635 the user interface of FIG. 4 displays the following letters:
l y u u i o c s t a At this point the reordering operation is complete and the user can review the reordered GUI elements on the display of data processing device 105, 305. Further selections by the user can be made and any such the further selections can be processed by data processing device 105, 305 with via another iteration of the method of FIG. 6.

Optionally, step 635 can include adjusting an aspect of a reordered GUI element to indicate that it has been reordered, either in this iteration of the method of FIG. 6 or in a previous iteration. The adjusted aspect can include any one or more of the following: a frame of the GUI element; a border of the GUI element; a size of the GUI element; a colour of the GUI element; a shape of the GUI element; an opacity of the GUI element; a and a location of the GUI element on the display. The GUI element itself may be altered, e.g. by including a superscript number within the GUI element to indicate the order of selection. Other suitable aspects for adjustment will be readily apparent to a skilled person having the benefit of the present disclosure. This may assist the user in easily identifying those GUI elements that they have already reordered, to avoid repeat attempts to reorder a given GUI element. Additionally, the user can easily identify the position of the edit position index as the last GUI element with the alteration applied, which can assist the user in a next reordering operation. User feedback of this type may therefore further improve user experience. In a preferred implementation, reordered GUI elements are underlined.

Referring now to FIG. 7, a second method for performing the reordering of step 510 is disclosed, according to an embodiment of the invention. Where the embodiment of FIG. 6 reorders based on the earliest selection of a GUI element in the case of multiple selections of a given GUI element, the embodiment of FIG. 7 reorders based on the latest selection of the multiply selected GUI element.

In step 700, data processing device 105, 305 stores, in an input list, for each of the one or more selection events (step 505), the unique index associated with the one of the plurality of GUI elements selected in the respective selection event. Step 700 is the same as step 600 and so is not described in further detail here.

In step 705, data processing device 105, 305 reads an edit position index stored in its memory, the edit position index specifying a start position within the ordered arrangement. Step 705 is the same as step 605 and so is not described in further detail here.

In step 710, data processing device 105, 305 generates an empty output list. Step 710 is the same as step 610 and so is not described in further detail here.

In step 715, data processing device 105, 305 parses the input list in reverse order and, for each entry in the input list, if the entry is not marked as consumed, copies the corresponding unique index to the output list, and marks the copied entry as consumed in the input list. This step is the same as step 615 in all aspects other than that the parsing is performed in reverse order. This means that, in the case where the user selects a particular GUI element more than once, in the embodiment of FIG. 7 the latest selection of the GUI element will dictate the position of that GUI element within the reordered arrangement. Effectively, all but the last selection of the same GUI element is/are ignored in the embodiment of FIG. 7 for the purposes of reordering because the reverse order of parsing of the input list means that the latest selection of a given GUI element is processed first by data processing device 105, 305. Earlier selections of this GUI element are not processed because by this point in the parsing operation the unique index corresponding to the GUI element has already been marked as consumed.

At the end of the operation of step 715 the output list thus contains one instance of each unique index corresponding to the selected GUI elements, where the order of the unique indexes in the output list reflects the last selection of each of the selected GUI elements. Returning to the example given in connection with FIG. 6 where the user has selected l and y (see also FIG. 4 and Table 2), the output list at this point has the form {4, 9}.

Once the entire input list has been parsed, in step 718 data processing device reverses the order of the output list. That is, the first element within the output list becomes the last, the second element becomes the penultimate element, and so on. Following step 718, the exemplary output list discussed above has the form {9, 4}.

In step 720 data processing device 105, 305 prepends to the output list the unique index of any of the plurality of GUI elements that have an associated unique index that is less than the edit position index, and marks each said GUI element as consumed. Step 720 is the same as step 620 and so is not described in further detail here.

In step 725 data processing device 105, 305 sets the edit position index based on a size of the output list. Step 725 is the same as step 625 and so is not described in further detail here.

In step 730, data processing device 105, 305 appends to the output list the unique index of any of the plurality of GUI elements that are not marked as consumed. Step 730 is the same as step 630 and so is not described in further detail here.

In step 735, data processing device 105, 305 displays the plurality of GUI elements on the display in the order specified by the output list. In the case of the example output list {9, 4, 0, 1, 2, 3, 5, 6, 7, 8}, upon completion of step 735 the user interface of FIG. 4 displays the following letters:

l y u u i o c s t a

Step 735 is the same as step 635 and so is not described in further detail here.

At this point the reordering operation is complete and the user can review the reordered GUI elements on the display of data processing device 105, 305. Further selections by the user can be made, and any such further selections can be processed by data processing device 105, 305 with via another iteration of the method of FIG. 7.

Optionally, step 735 can include adjusting an aspect of a reordered GUI element to indicate that it has been reordered, either in this iteration of the method of FIG. 7 or in a previous iteration. The adjusted aspect can include any one or more of the following: a frame of the GUI element; a border of the GUI element; a size of the GUI element; a colour of the GUI element; a shape of the GUI element; an opacity of the GUI element; a and a location of the GUI element on the display. Other suitable aspects for adjustment will be readily apparent to a skilled person having the benefit of the present disclosure. This may assist the user in easily identifying those GUI elements that they have already reordered, to avoid repeat attempts to reorder a given GUI element. This may further improve user experience.

Optionally, in the case of the method of either FIG. 6 or FIG. 7, the user may be provided with 'group move' functionality to enable the GUI elements reordered in the most recent iteration of the method of FIG. 6 or FIG. 7 to be moved as a group relative to the other GUI elements. This functionality may take the form of a button, for example. Alternatively the user may be able to move reordered GUI elements as a group via a particular form of user input, e.g. a gesture, one or more clicks, or via specific keys on a keyboard (e.g. arrow keys). Other suitable forms for this functionality will be apparent to a skilled person having the benefit of the present disclosure. In the example given above, the user is presented with the letters:

l y u u i o c s t a

This is following completion of the method of FIG. 6 or FIG. 7, with reordered GUI elements being shown in bold. The user can use the group move functionality to move the reordered letters 1 and y to the end of the ordered arrangement, such that the user is presented with the arrangement directly below following this operation:

u u i o c s t a l y

This functionality enables the user to reorder GUI elements in a more flexible manner, further improving user experience.

When GUI elements are moved as a group in this way, the edit position index may need to be updated to reflect this move. The edit position index is preferably set to zero following a group move operation of this type.

Figure 8:
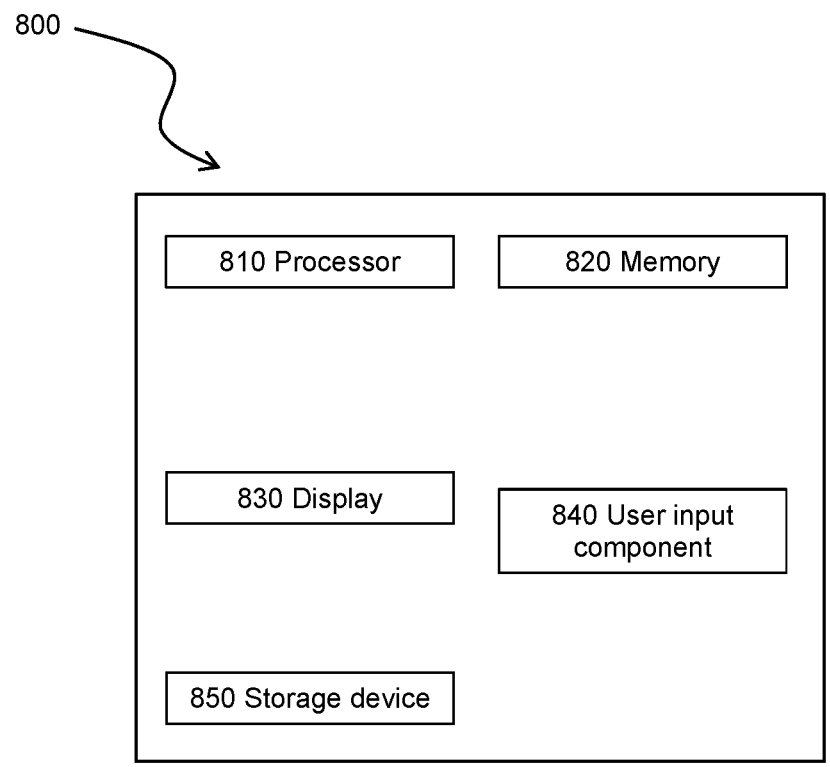
FIG. 8 shows in schematic form a data processing device suitable for implementing embodiments of the invention.

By way of example, FIG. 8 shows in schematic form a data processing device 800 that is suitable for implementing the present invention. For example, data processing device 105 and data processing device 305 may be identical or substantially identical to data processing device 800.

Data processing device 800 includes a processor 810 for executing instructions. Instructions may be stored in a memory 820, for example. Processor 810 may include one or more processing units (e.g., in a multi-core configuration) for executing instructions. The instructions may be executed within a variety of different operating systems on the data processing device 800, such as UNIX, LINUX, Microsoft Windows®, etc.

Memory 820 may include, but is not limited to, any combination of random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Processor 810 is operatively coupled to a display 830 such that processor 810 is capable of controlling display 830. Processor 810 is also operatively coupled to user input component 840 and receiving commands from a user.

Data processing device 800 further includes a storage device 850. Storage device 850 preferably takes the form of a non-volatile storage medium, e.g. one or more of: a hard disk drive, a solid state drive, a non-volatile memory (NVM), and the like. One or more software applications may be installed on data processing device 800. The one or more software applications may be stored on storage device 850, and may place information in memory 820 during their execution.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The invention claimed is:

1. A computer-implemented method for receiving user input to a data processing device having a user input component, a memory and a display, the user input component for enabling a user to provide input to the data processing device, the method comprising, by the data processing device:

i) displaying a plurality of graphical user interface (GUI) elements on the display in an ordered arrangement, each of the plurality of GUI elements having an associated unique index corresponding to a position of a respective GUI element within the ordered arrangement;

ii) receiving, via the user input component, two or more selection events to select two or more GUI elements of the plurality of GUI elements in a selection order, each of the two or more selection events corresponding to a respective one of the two or more GUI elements of the plurality of GUI elements;

iii) interpreting the two or more selection events to select the two or more GUI elements displayed simultaneously prior to receiving the two or more selection events as a consecutive series of selection events in the selection order in response to a time between adjacent selection events of the two or more selection events being less than a threshold time; and iv) reordering the plurality of GUI elements on the display based on the selection order and the interpretation in response to no additional selection event of an additional GUI element being received within the threshold time after receiving a last selection event of the two or more selection events while a number of the two or more selection events is less than a number of the plurality of GUI elements, the additional GUI element being displayed simultaneously with the two or more GUI elements prior to receiving the two or more selection events, wherein the two or more GUI elements are moved to a front in a reordered arrangement in the selection order and one or more unselected GUI elements of the plurality of GUI elements are placed after the two or more GUI elements in the reordered arrangement, wherein step iv) further comprises:

storing, in an input list, for each of the two or more selection events, the unique index associated with respective one of the plurality of GUI elements selected in a respective selection event;

reading an edit position index stored in the memory, the edit position index specifying a start position within the ordered arrangement;

generating an output list, using an empty output list, based on the input list and the edit position index; and displaying the plurality of GUI elements on the display in the order specified by the output list.

2. The computer-implemented method of claim 1, further comprising, as part of step ii):

receiving, via the user input component, a plurality of selections of a selected GUI element of the plurality of GUI elements;

wherein the selected GUI element is located within the selection order at a position corresponding to an earliest selection of the selected GUI element.

3. The computer-implemented method of claim 1, wherein the generating the output list of step iv) comprises:

(A) parsing the input list in order and, for each entry in the input list, if the entry is not marked as consumed, copying a corresponding unique index to the output list, and marking the copied entry as consumed in the input list;

(B) prepending to the output list the unique index of any of the plurality of GUI elements that have an associated unique index that is less than the edit position index, and marking each of the plurality of GUI elements having the associated unique index that is less than the edit position index as consumed;

(C) setting the edit position index based on a size of the output list after step (B) and before step (D);

(D) appending to the output list the unique index of any of the plurality of GUI elements that are not marked as consumed.

4. The computer-implemented method of claim 1, further comprising, as part of step ii):

receiving, via the user interface component, a plurality of selections of a selected GUI element of the plurality of GUI elements;

wherein the selected GUI element is located within the selection order at a position corresponding to a latest selection of the selected GUI element.

5. The computer-implemented method of claim 1, wherein the generating the output list of step iv) comprises:

(E) parsing the input list in reverse order and, for each entry in the input list, if the entry is not marked as consumed, copying the corresponding unique index to the output list, and marking the copied entry as consumed in the input list;

(F) reversing the order of the output list;

(G) prepending to the output list the unique index of any of the plurality of GUI elements that have an associated unique index that is less than the edit position index, and marking each said GUI element as consumed;

(H) setting the edit position index based on a size of the output list after step N) (G) and before step (I); and (I) appending to the output list the unique index of any of the plurality of GUI elements that are not marked as consumed.

6. The computer-implemented method of claim 1, further comprising:

receiving, via the user input component, a reset command; and setting a position index to the start position within the ordered arrangement.

7. The computer-implemented method of claim 6, further comprising:

before or as part of step i), storing an initial order of the plurality of GUI elements; and responsive to the reset command, displaying the plurality of GUI elements in the initial order.

8. The computer-implemented method of claim 1, further comprising, after step iv):

receiving, via the user input component, a command to exit a reordering mode; and interpreting user input received after the command to exit a reordering mode as relating to an operation other than a reordering operation.

9. The computer-implemented method of claim 1, further comprising, as part of step ii):

adjusting an aspect of each of the two or more selected GUI elements to indicate that they have been selected, the aspect including any one or more of:

a respective frame of each of the two or more selected GUI elements;

a respective border of each of the two or more selected GUI elements;

a respective size of the each of the two or more selected GUI elements;

a respective color of each of the two or more selected GUI elements;

a respective shape of each of the two or more selected GUI elements;

a respective opacity of each of the two or more selected GUI elements; and a respective location of each of the two or more selected GUI elements on the display; and/or modifying each of the two or more selected GUI elements to include a superscript number indicating a position of a respective GUI element of the two or more selected GUI elements in the selection order.

10. The computer-implemented method of claim 1, wherein each of the plurality of GUI elements has an associated property that determines whether the respective GUI element is selectable, the method further comprising, as part of step iv):

setting the property for each of the two or more selected GUI elements respectively corresponding to the two or more selection events such that each of the two or more selected GUI elements is not selectable.

11. The computer-implemented method of claim 1, further comprising, after step iv):

receiving, via the user input component, a move command to move the two or more GUI elements corresponding to the two or more selection events; and reordering the plurality of GUI elements on the display based on the move command.

12. The computer-implemented method of claim 11, wherein the move command specifies that the two or more GUI elements are to be moved to an end of the reordered GUI elements, and the method further comprises:

reordering the plurality of GUI elements on the display by displaying the two or more GUI elements at the end of the reordered GUI elements.

13. The computer-implemented method of claim 1, wherein the data processing device is a portable data processing device.

14. The computer-implemented method of claim 1, further comprising determining that a GUI element selection is complete in response to no additional selection event being received within the threshold time after receiving the last selection event of the two or more selection events;

wherein the plurality of GUI elements are reordered in response to determining that the GUI element selection is complete.

15. The computer-implemented method of claim 1, wherein the computer-implemented method further comprises:
receiving, via the user input component, at least one selection event to select a same GUI element as one of the two or more GUI elements of the plurality of GUI elements after the two of more selection events,
wherein the two or more selection events to select the two or more GUI elements are interpreted as the consecutive series of selection events in the selection order while ignoring the at least one selection event.

16. The computer-implemented method of claim 1, wherein the computer-implemented method further comprises:
receiving, via the user input component, at least one selection event to select a same GUI element as one of the two or more GUI elements of the plurality of GUI elements prior to the two of more selection events,
wherein the two or more selection events to select the two or more GUI elements are interpreted as the consecutive series of selection events in the selection order while ignoring the at least one selection event.

17. A data processing device comprising a user input component, a memory and a display, the data processing device configured to
i) display a plurality of graphical user interface (GUI) elements on the display in an ordered arrangement, each of the plurality of GUI elements having an associated unique index corresponding to a position of a respective GUI element within the ordered arrangement;
ii) receive, via the user input component, two or more selection events to select two or more GUI elements of the plurality of GUI elements in a selection order, each of the two or more selection events corresponding to a respective one of the two or more GUI elements of the plurality of GUI elements;
iii) interpreting the two or more selection events to select the two or more GUI elements displayed simultaneously prior to receiving the two or more selection events as a consecutive series of selection events in the selection order in response to a time between adjacent selection events of the two or more selection events being less than a threshold time; and
iv) reorder the plurality of GUI elements on the display based on the selection order and the interpretation in response to no additional selection event of an additional GUI element being received within the threshold time after receiving a last selection event of the two or more selection events while a number of the two or more selection events is less than a number of the plurality of GUI elements, the additional GUI element being displayed simultaneously with the two or more GUI elements prior to receiving the two or more selection events, wherein the two or more GUI elements are moved to a front in a reordered arrangement in the selection order and one or more unselected GUI elements of the plurality of GUI elements are placed after the two or more GUI elements in the reordered arrangement,
wherein the data processing device at step iv) is further configured to:
store, in an input list, for each of the two or more selection events, the unique index associated with respective one of the plurality of GUI elements selected in a respective selection event;
read an edit position index stored in the memory, the edit position index specifying a start position within the ordered arrangement;
generate an output list, using an empty output list, based on the input list and the edit position index; and
display the plurality of GUI elements on the display in the order specified by the output list.

18. The data processing device of claim 17, wherein the data processing device is further configured to:
determine that a GUI element selection is complete in response to no additional selection event being received within the threshold time after receiving the last selection event of the two or more selection events;
wherein the plurality of GUI elements are reordered in response to determining that the GUI element selection is complete.

19. A non-transitory computer-readable storage medium storing computer-readable instructions which, when executed by a data processing device comprising a user input component, a memory and a display, cause the data processing device to:
i) display a plurality of graphical user interface (GUI) elements on the display in an ordered arrangement, each of the plurality of GUI elements having an associated unique index corresponding to a position of a respective GUI element within the ordered arrangement;
ii) receive, via the user input component, two or more selection events to select two or more GUI elements of the plurality of GUI elements in a selection order, each of the two or more selection events corresponding to a respective one of the two or more GUI elements of the plurality of GUI elements;
iii) interpret the two or more selection events to select the two or more GUI elements displayed simultaneously prior to receiving the two or more selection events as a consecutive series of selection events in the selection order in response to a time between adjacent selection events of the two or more selection events being less than a threshold time; and
iv) reorder the plurality of GUI elements on the display based on the selection order and the interpretation in response to no additional selection event of an additional GUI element being received within the threshold time after receiving a last selection event of the two or more selection events while a number of the two or more selection events is less than a number of the plurality of GUI elements, the additional GUI element being displayed simultaneously with the two or more GUI elements prior to receiving the two or more selection events, wherein the two or more GUI elements are moved to a front in a reordered arrangement in the selection order and one or more unselected GUI elements of the plurality of GUI elements are placed after the two or more GUI elements in the reordered arrangement,
wherein the computer-readable instructions at step iv) further cause the data processing device to:
store, in an input list, for each of the two or more selection events, the unique index associated with respective one of the plurality of GUI elements selected in a respective selection event;
read an edit position index stored in the memory, the edit position index specifying a start position within the ordered arrangement;
generate an output list, using an empty output list, based on the input list and the edit position index; and display the plurality of GUI elements on the display in the order specified by the output list.

20. The non-transitory computer-readable storage medium of claim 19, wherein the computer-readable instructions cause the data processing device to:
   determine that a GUI element selection is complete in response to no additional selection event being received within the threshold time after receiving the last selection event of the two or more selection events;
   wherein the plurality of GUI elements are reordered in response to determining that the GUI element selection is complete.

\* \* \* \* \*